(12) United States Patent
Wang

(10) Patent No.: US 7,706,257 B2
(45) Date of Patent: Apr. 27, 2010

(54) PROTECTION METHOD FOR RING NETWORK OF OPTICAL TRANSMISSION NETWORK

(75) Inventor: Guangjun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 11/571,521

(22) PCT Filed: May 29, 2006

(86) PCT No.: PCT/CN2006/001133

§ 371 (c)(1),
(2), (4) Date: Dec. 30, 2006

(87) PCT Pub. No.: WO2006/128368

PCT Pub. Date: Dec. 7, 2006

(65) Prior Publication Data

US 2008/0069563 A1 Mar. 20, 2008

(30) Foreign Application Priority Data

May 29, 2005 (CN) .................... 2005 1 0034991

(51) Int. Cl.
*H04J 1/16* (2006.01)
(52) U.S. Cl. .................................... 370/222
(58) Field of Classification Search ......... 370/216–228; 398/1, 2, 3, 4, 9, 17
See application file for complete search history.

(56) References Cited

U.S. PATENT DOCUMENTS

| | | | | |
|---|---|---|---|---|
| 6,144,633 A | * | 11/2000 | Ikeda et al. ............. | 370/217 |
| 6,366,556 B1 | * | 4/2002 | Ballintine et al. ........... | 370/216 |
| 2002/0009091 A1 | * | 1/2002 | Taniguchi .................... | 370/403 |
| 2003/0145254 A1 | * | 7/2003 | Ookawa et al. .............. | 714/43 |
| 2003/0189895 A1 | * | 10/2003 | Limaye et al. ............. | 370/216 |
| 2005/0099941 A1 | * | 5/2005 | Sestito et al. ............... | 370/228 |

FOREIGN PATENT DOCUMENTS

| | | |
|---|---|---|
| CN | 1555163 A | 12/2004 |
| WO | 02/073855 A2 | 9/2002 |

OTHER PUBLICATIONS

Foreign Communication From a Related Counterpart Application—International Search Report and Written Opinion, PC/CN2006/001133, Jul. 6, 2007.

* cited by examiner

*Primary Examiner*—Kwang B Yao
*Assistant Examiner*—Obaidul Huq
(74) *Attorney, Agent, or Firm*—Conley Rose, P.C.; Grant Rodolph

(57) ABSTRACT

A ring network protection method for an optical transmission network relates to digital information transmission, and includes using the overhead byte APS/PCC in the ODUk to transmit the protection information of the APS. The method adds fields in the APS/PCC and further includes: (a) the network element in which the protection switching takes place in the OTN sends the protection switching information to other network elements through the fields set in the APS/PCC of the ODUk; and the network element which received the ODUk performs corresponding processing according to the fields carried by the APS/PCC in the ODUk and implements the protection switching for the OTN ring network.

2 Claims, 4 Drawing Sheets

| 1 | | | 2 | | | | 3 | | | | 4 | | | |
|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| A1 | A2 | A3 | B1 | B2 | B3 | B4 | C1 | C2 | D1 | D2 | D3 | D4 | D5 | E1 | E2 | E3 | E4 | E5 | F1 | F2 | F3 | F4 | F5 | G1 | H1 | H2 | H3 | I1 | I2 | I3 | I4 |
| A serial number | | | B switch page number | | | | C protocol type | | D switching request | | | | | E requested destination network element number | | | | | F requested source network element number | | | | G LS bwli | H switch status | | | I check | | | |

| column # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| line# 1 | | | | | | | | | | | | | | | OPUk overhead | |
| 2 | RES | | | TCM ACT | TCM6 | | | TCM5 | | | TCM4 | | | FTFL | | |
| 3 | TCM3 | | | TCM2 | | | TCM1 | | | PM | | | EXP | | | |
| 4 | GCC1 | | GCC2 | | APS/PCC | | | RES | | | | | | | | |

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| A1 | A2 | A3 | B1 | B2 | B3 | B4 | C1 | C2 | D1 | D2 | D3 | D4 | D5 | E1 | E2 | E3 | E4 | E5 | F1 | F2 | F3 | F4 | F5 | G1 | H1 | H2 | H3 | I1 | I2 | I3 | I4 |
| A serial number | | | B switch page number | | | | C protocol type | | D switching request | | | | | E requested destination network element number | | | | | F requested source network element number | | | | | G LS path flag | H switch status | | | I check | | | |

Fig. 6

PROTECTION METHOD FOR RING NETWORK OF OPTICAL TRANSMISSION NETWORK

CROSS REFERENCE TO RELATED APPLICATIONS

This application is the U.S. national phase application of PCT Application No PCT/CN2006/01133 filed May 29, 2006 and entitled "A Method for Protecting the Ring Network of Optical Transport Network," which claims priority to Chinese Application No. 200510034991.6, filed on May 29, 2005 with the State Intellectual Property Office of the People's Republic of China, entitled "A Method for Protecting the Ring Network of Optical Transport Network."

FIELD OF THE INVENTION

The present invention relates to a digital information transmission technology, and more particularly to protection method for ring network of the optical transmission network.

BACKGROUND OF THE INVENTION

The Automatic Protection Switching (APS) is a necessary technology for the ring network. The ring network needs to use the APS technology to guarantee the least loss of the user information when the physical link becomes invalid or the signal transmission quality deteriorates.

The Synchronous Digital Hierarchy (SDH) network is a kind of comparatively mature optical network and has been in use for more than ten years. The information transmission technologies of SDH network have been fully used in the field of information transmission. Among the information transmission technologies of SDH network, the Multiplex Section Protection (MSP) is the most distinctive and practical technology. It uses k bytes in the SDH multiplex section, i.e. two overhead bytes k1 and k2 to transmit the protection switching information of the APS, i.e. the signalling of the APS protocol, wherein the two overhead bytes k1 and k2 occupy two bytes in all. All the network elements that received the SDH multiplex section will process the APS protocol signalling in the two overhead bytes of the SDH multiplex section so as to implement APS for the services in the ring network.

The G.841 protocol is an international standard on the switching of the multiplex section instituted by the Telecommunication Standardization Sector of ITU (ITU_T) and describes in detail the coding of the k bytes and the switching rule of the MSP technology and provides a comparatively complete switching rule. The G.841 protocol is a basis for realizing protection for the ring network. The G.841 protocol allocates the switching request field, the requested destination network element field, the requested source network element field, requested long or short path flag field and the switch status field in the k bytes.

Although currently the G.841 protocol provides the comparatively complete switching rule, there still exist some problems which make it difficult to accomplish the protection switching of the ring network.

The optical transport network (OTN) technology is also proposed. This technology is a newcomer in the transmission field and mainly introduces some mechanisms of SDH in the wave division field.

The OTN technology also introduced the most distinctive and practical technology of the SDH technology, i.e., the MSP technology. Specifically, the overhead bytes in the Optical Channel Data Unit-k (ODUk), i.e. the APS/PCC are used to transmit the protection switching information of the APS, i.e. the APS signaling, and the overhead bytes occupy four bytes.

Since the ring network protection technology for the OTN adopts the SDH multiplex section protection mechanism, the same problem as that in the SDH APS exists, i.e. the ring network protection technology for the OTN cannot perform a well protection switching for the OTN network.

SUMMARY OF THE INVENTION

The present invention is to provide protection method for a ring network of the OTN ring network so that the problems occurring in the SDH APS will not appear in the OTN ring network when the protection switching for the OTN ring network is completed.

The present invention provides protection method for a ring network of the optical transmission network, which includes a step of using the overhead bytes APS and PCC in the ODUk to transmit the protection switching information of the APS, wherein fields are added to the APS/PCC, and the method further includes steps of:

a. the initial protecting network element in the OTN transmitting the protection switching information to other network elements through the fields set in the APS/PCC of the ODUk;

b. the network element which received the ODUk performing corresponding processing according to the fields carried by the APS/PCC of the ODUk and implements the protection switching for the OTN ring network.

The added field in APS/PCC includes a serial number field.

The method further includes: setting the serial numbers for the two neighboring network elements in which the protection switching takes place according to the direction pointing to the opposed network element, and setting the changing rule for the serial number of the network element; the step of transmitting the protection switching information to other network elements through the fields set in the APS/PCC of the ODUk further comprising: changing the serial number of the current transmission direction of the network element according to the set rule and sending the changed serial number to other network elements through the serial number field in the APS/PCC; the step of the network element which received the ODUk performing corresponding processing according to the fields carried by the APS/PCC of the ODUk, and implementing the protection switching for the OTN ring network further comprising: the network element obtaining the serial number carried in the serial number field in the APS/PCC and comparing it with the one stored in the network element itself and corresponding to the network element, and if the two serial numbers accord with the set rule, it can be determined that no overhead byte is lost, and the obtained serial number is used to update the one stored in the network element itself; otherwise, it can be determined that there are lost overhead bytes, or reporting an alarm is further initiated.

The set rule requires that, when the network element needs to send the ODUk, its own serial number be added by 1.

The set rule further includes: for the span switch, only when the ODUk sent from other network element is received through the short path, the serial number is added by 1; for the ring switch, only when the ODUk is received from other network elements through the long path, the serial number is added by 1.

In the step of the network element which received the ODUk performing corresponding processing according to the fields carried by the APS/PCC of the ODUk, and implementing the protection switching for the OTN ring network, before the network element determines that the overhead bytes are lost, the step further includes: determining whether the current switch belongs to the span switch and the short path protection fiber is damaged, or determining whether the current switch belongs to the ring switch, and a request with a higher priority for the long path is received, or the coexisting switching request is received, or the inverted protection fiber is damaged, and if any one of the above cases occurs, determining that the overhead bytes are not lost and then updating the serial number stored itself with the obtained serial number; otherwise, determining that the overhead bytes are lost.

The added fields in the APS/PCC include a check field; the step of transmitting the protection switching information to other network element through the fields set in the APS/PCC of the ODUk includes: the network element processing the APS/PCC by using the check code and sending the check code to other network elements through the check field in the APS/PCC; the step of the network element which received the ODUk performing corresponding processing according to the fields carried by the APS/PCC of the ODUk, and implementing the protection switching for the OTN ring network includes checking the APS/PCC with the check code.

In the step of the network element processing the APS/PCC by using the check code refers that the APS/PCC is processed through inserting the odd and even bytes in the APS/PCC bytes.

The fields added in the APS/PCC include a switch page related information field.

the method further includes: setting the matching relations of the switch pages. The step of transmitting the protection switching information to other network element through the fields set in the APS/PCC of the ODUk includes: the network element sending the related information of its own switch page to other network elements through the switch page number field in the APS/PCC; the step the network element which received the ODUk performing corresponding processing according to the fields carried by the APS/PCC of the ODUk and implementing the protection switching for the OTN ring network includes: the network element obtaining related information of the switch page in the switch page related information field carried by the APS/PCC, and determining whether the switch page corresponding to the related information matches that the one of the present network element according to the matching relation of the switch pages, if yes, performs the switch processing; otherwise, stopping processing the APS/PCC and sending the stop protocol to other network elements through the switch page related information field to stop processing the APS/PCC protocol.

The method further includes:

c. each network element that received the stop protocol stopping processing the APS/PCC and sending the APS/PCC to other network elements hop by hop till reaching the network element in which the protection switching takes place;

d. the network element in which the protection switching takes place in the step a stopping processing the APS/PCC and sending the response message to the network element which initiates the stop protocol;

e. after receiving the response message, the network element which initiates the stop protocol sending the start protocol identifying the start-up of the OTN ring network to other network elements through the switch page related information field in the APS/PCC;

f. each network element that received the start protocol beginning to process the APS/PCC and sending the APS/PCC to other network elements hop by hop till reaching the network element in which the protection switching takes place.

The step each network element that received the stop protocol stopping processing the APS/PCC and sending the APS/PCC to other network elements hop by hop till the network element in which the protection switching takes place further includes: after receiving the stop protocol, each network element starting up a timer, and if receiving the start protocol before the timer is overtime, performing the step of each network element that received the start protocol beginning to process the APS/PCC and sends the APS/PCC to other network elements hop by hop till the network element in which the protection switching takes place; otherwise, automatically imitates the protocol of the present network element and processes the APS/PCC.

The added fields in the APS/PCC include a protocol type field; the step of transmitting the protection switching information to other network elements through the fields set in the APS/PCC of the ODUk includes: sending the protocol type employed in the present network element to other network elements through the protocol type field in the APS/PCC; the step of the network element which received the ODUk performing corresponding processing according to the fields carried by the APS/PCC of the ODUk, and implementing the protection switching for the OTN ring network includes: obtaining the protocol type in the protocol type field carried by the APS/PCC, and when the protocol type is not identical with the one used in the present network element, initiating a report of an alarm.

A switching request field is set in the APS/PCC.

And the method further includes: extending the bits occupied by the switching request field and allocating flags for the LP-S and SF-P requests respectively.

A requested source network element number field and/or a requested destination network element number field are/is set in the APS/PCC.

And the method further includes: extending the bits occupied by the requested source network element number field and/or the requested destination network element number field. The present invention applies the mature and effective SDH APS protocol, i.e. the G.841 protocol to protection for the ring network of the OTN ring network, adopts the overhead byte APS/PCC in the ODUk to transmit the APS protocol signaling and extends the G.841 protocol, i.e., the overhead byte APS/PCC. The network elements in the ring network of OTN perform the corresponding processing according to the fields carried by the overhead byte APS/PCC in the received ODUk so that the protection switching is implemented for the ring network of OTN, thus the problems occurring in the SDH APS will not appear in the ring network of OTN.

Specifically, the serial number field is partitioned in the overhead byte APS/PCC, and the network element processes the serial number so as to prevent the mal-operation caused by the loss of the overhead bytes.

In the present invention, the check field is set in the overhead byte APS/PCC. Specifically the odd and even bytes are inserted between bits to check the overhead byte APS/PCC. In this way, the probable error codes may appear during the transmission of the overhead byte APS/PCC, and the mal-operation caused by the error code can be prevented, and the robust performance of the switching is guaranteed.

In the present invention, the switch page related information field is checked and controlled so as to provide the automatic processing mechanism for the switching recovery to make the system automatically recover to the normal switch status.

In the present invention, the amount of the bits occupied by the switching request is increased and the range of value for the switching request is extended. The overhead byte APS/

PCC can be used to distinguish between the LP-P and the SF-P so as to further improve the practicability and operability of the present invention.

In the present invention, the protocol type field is set in the overhead byte APS/PCC so that the network element can determine according to the protocol type whether the protocol adopted in multiplex section protection is the cross-ocean APS or the normal APS or some version of the normal APS or other versions. In this way, the protocol type can be effectively checked, and the practicability of the present invention can be improved.

BRIEF DESCRIPTION OF THE DRAWINGS

FIG. 6 is a schematic diagram showing the allocation of the APS/PCC.

DETAILED DESCRIPTION OF THE INVENTION

The present invention will be described in detail with reference to the drawings and embodiments.

Figures 1, 2:
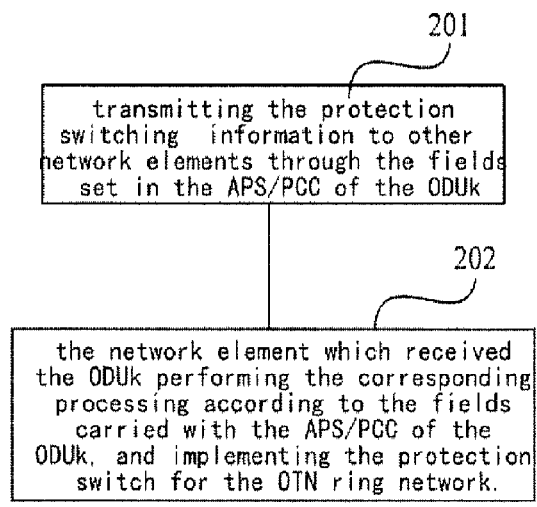
FIG. 1 is a schematic diagram showing the allocation of each overhead byte in the ODUk proposed in the G.798 recommended by current ITU-T.
FIG. 2 is a flow chart showing the implementation of an embodiment of the present invention.

In one embodiment of the present invention, for the OTN ring network to which G.841 protocol is applied, the overhead bytes APS/PCC of the G.841 protocol are extended, and the overhead byte APS/PCC in the ODUk are fully used to transmit the APS signaling so as to solve problems existing in the APS in the OTN ring network. FIG. 1 shows the allocation of each overhead byte in the ODUk proposed in the G.798 by current ITU-T.

Since the OTN ring network introduces the MSP technology, and the MSP technology has already allocated a switching request field, a requested destination network element number field, a requested source network element number field, and a requested long or short path flag field, these fields have also been allocated in the APS/PCC.

In the present embodiment, other fields can be set in the overhead byte APS/PCC, and the network elements in the OTN ring network perform the corresponding processing according to the received fields carried by the overhead bytes APS/PCC in the ODUk so as to implement the protection switching for the OTN ring network.

For example, the network elements in the OTN can perform the flow shown in FIG. 2, wherein the processing includes following steps:

Step 201, the network element transmits the protection switching information to other network elements through the fields set in the APS/PCC of the ODUk;

Step 202, the network element that received the ODUk performs the corresponding processing according to the fields carried by the APS/PCC of the ODUk and implements the protection switching for the ring network of OTN.

According to the technical solution of the present embodiment, the existing fields in the overhead byte APS/PCC also can be set so as to transmit more information to the opposed network element through the overhead byte APS/PCC. Then the opposed network element performs the corresponding processing so as to implement the protection switching for the OTN ring network.

The adding and modifying of fields are described in detail as follows.

In the technical solution of the present embodiment, a serial number field is set in the overhead byte APS/PCC so as to overcome the probable problem of mal-operation caused by the loss of the overhead bytes. The serial numbers for the two neighboring network elements where the protection switching takes place are set according to the direction pointing to the opposed network element, and the changing rule for the serial number is set. The network element changes its own serial number according to the rule. The network element that received the ODUk compares its own stored serial number with the one carried by the serial number field in the overhead byte APS/PCC in the ODUk and performs the corresponding processing according to the compared result.

Figure 3:
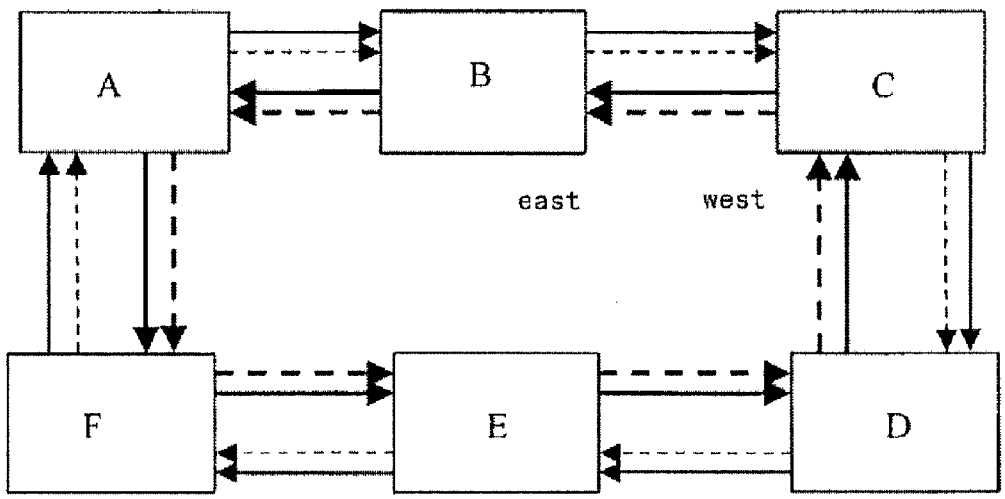
FIG. 3 is a schematic diagram showing the connection relation between the network elements in the OTN ring network.
Figure 4:
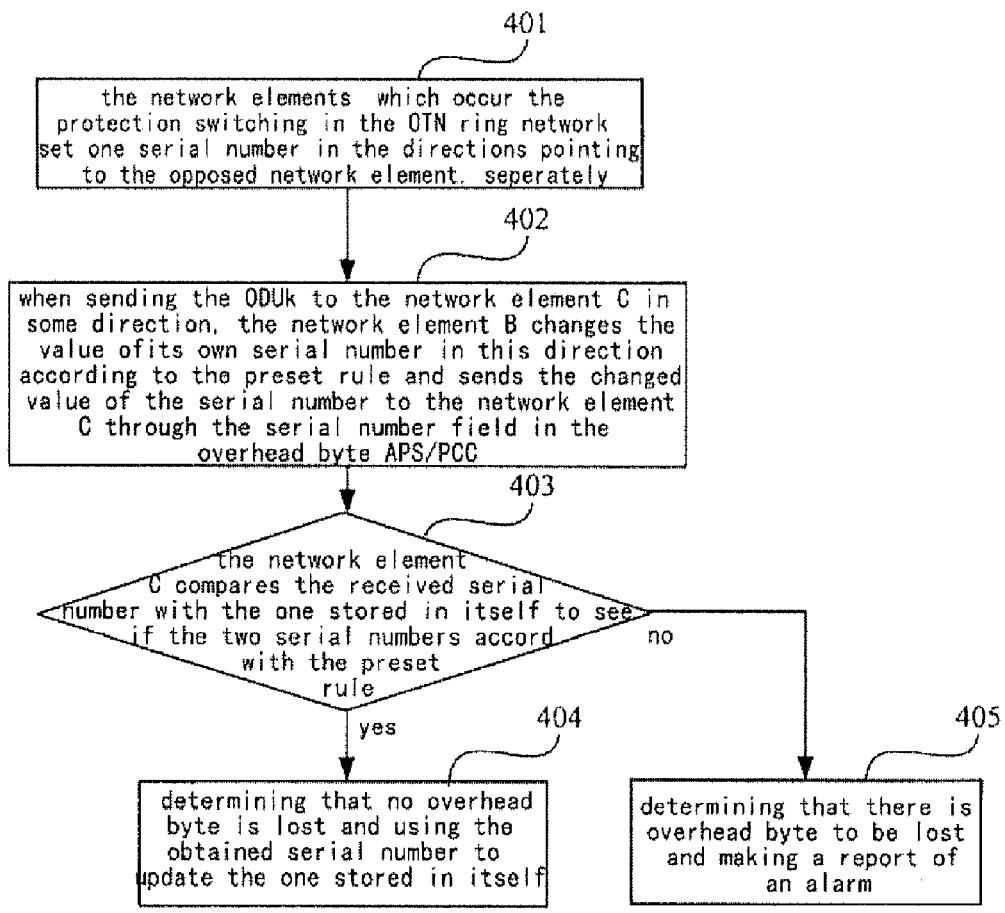
FIG. 4 is a flow chart showing the detailed implementation of the processing for the serial number according to an embodiment of the present invention.

The above processing for the serial number is described with an example of processing between the network elements B and C shown in FIG. 3. The processing is shown in FIG. 4 and includes the following steps:

Step 401, the network element in which the protection switching takes place in the OTN ring network set one serial number in the directions pointing to the opposed network element, respectively.

The serial number in the west direction of the network element C corresponds to the serial number in the east direction of the network element B. In the present embodiment, the two serial numbers are set to be the same.

Step 402, when sending the ODUk to the network element C in some direction, the network element B changes the serial number in this direction according to the preset rule and sends the changed serial number to the network element C through the serial number field in the overhead byte APS/PCC of the ODUk.

As shown in FIG. 2, the network element B will send the ODUk to the network element C in the east direction.

Steps 403~405, after obtaining the serial number in the serial number field of the overhead byte APS/PCC in the ODUk sent from the network element B, the network element C compares it with the one stored in itself and corresponding to the network element B, and if the two serial numbers accord with the preset rule, the network element C determines that no overhead byte is lost, and then uses the obtained serial number is used to update the one stored in itself and corresponding to the network element B; if the two serial numbers do not accord with the preset rule, it can be determined that there are lost overhead bytes, and reporting an alarm may be initiated.

The processing such as alarm can be implemented by the above procedures when the overhead bytes are lost.

The above rule can be specifically set according to the requirement. For example, the rule is set as follows: each time the network element needs to send an overhead byte APS/PCC, its own serial number is increased by 1. Then, the network element sends the increased serial number to other network elements utilizing the overhead byte APS/PCC. In this way, if the serial number in the serial number field of the received overhead byte APS/PCC is bigger than the current serial number of the network element by 1, then it can be determined that the two serial numbers accord with the rule and so there is no lost overhead byte.

In addition, the protection switching includes the span switch and the ring switch. Specifically, it can be determined according to the switching request that the current switch is either the span switch or the ring switch. For example, the Forced Switch (Span) is a kind of span switching and the Forced Switch (Ring) is a kind of ring switch. For the span switch, it is needed to change the serial number only when the protection switching is for the short path, i.e. only when the network element in which the switching takes place receives the overhead APS/PCC sent from the opposed network element through the short path; for the ring switch, it is needed to change the serial number only when the protection switching is for the long path, i.e. only when the network element in which the switch takes place receives the overhead APS/PCC sent from the opposed network element through the long path. Therefore, such information should also be set in the rule, wherein, the long or short path of the current protection switching may be identified according to the long or short path flag field in the overhead byte APS/PCC.

For the span switch, if the short path protection fiber is damaged, and for the ring switch, if the received request is a request with higher priority for the long path, or the switching request that can coexist, or the inverted protection fiber is damaged, the network element may not initiate alarm but will use the serial number field in the overhead byte APS/PCC in the ODUk to update the one stored locally and corresponding to the opposed network element when it receives the ODUk. The reason for making such a processing is that the above cases show that there are more than two protection switchings take place on the ring so that some overhead bytes cannot be transmitted, which are not lost overhead bytes. Therefore, it is inaccurate to determine whether the overhead bytes are lost according to the serial number in this case.

In the present embodiment, in order to avoid the probable overhead byte error, a check field is added into the overhead byte APS/PCC to check the overhead byte APS/PCC. For example, the odd and even bytes are inserted between bits to check the overhead byte APS/PCC. Specifically, the network element divides the overhead byte APS/PCC into four blocks. Since the APS/PCC has four bytes, each byte is a block. Then the four blocks are arranged. For example, the APS/PCC is divided into four bytes (blocks?): A1=00110011, A2=11001100, A3=101010110, A4=000011114, and the four bytes (blocks?) are arranged as the follows:

A1 00110011
A2 11001100
A3 10101010
A4 00001111

Then an 8-bit check code is put into the above arrangement. For example the check code is B=01011010 and then the above processed overhead byte APS/PCC is sent to the opposed network element; the opposed network element performs the inverse operation and thus may find how many columns there are in the four bytes in which error codes appear.

In the present embodiment, in order to solve the problem that the system cannot automatically recover to the normal switch status due to failure of the switching, the switch page related information field is added into the overhead byte APS/PCC. Practically, if the switch page number is set for the switch page, it may be the related information, i.e., the switch page number field is added in the overhead byte APS/PCC. Then each network element will compare its own switching page with the one corresponding to the switch page number field in the overhead byte APS/PCC in the ODUk sent from the neighboring network elements, and the switch pages of the network elements at both ends of the same section need to match with each other. In the present embodiment, the switch page corresponding to the switch page number field in the overhead byte APS/PCC is checked so as to control the switch status of the whole ring network according to the check result.

Firstly, each switch page and matching relations therebetween will be illustrated. Assuming that 4 bits are allocated to the switch page number field, the value and the meaning of each switch page are shown in Table 1.

TABLE 1

| Switch page | Value | Meaning |
| --- | --- | --- |
| SWITCH_PAGE_IDLE | 0000 | Idle page |
| SWITCH_PAGE_PASS | 0001 | Pass page |
| SWITCH_PAGE_RING_WEST | 0010 | West ring switch page |
| SWITCH_PAGE_RING_EAST | 0011 | East ring switch page |
| SWITCH_PAGE_SPAN_WEST | 0100 | West span switch page |
| SWITCH_PAGE_SPAN_EAST | 0101 | East span switch page |
| SWITCH_PAGE_SPAN_BOTH | 0110 | Bi-direction span switch page |
| STOP_PROTOCOL | 0111 | Stop protocol |
| START_PROTOCOL | 1000 | Start protocol |
| Others | | Reserved |

The ring network of OTN has two directions. The current protection switching may be sent from the east neighboring network element, and also may be sent from the west neighboring network element. In the two cases, the matching relations of the switch pages of the two network elements are different. The matching relations of the switch pages are shown in Table 2 when the east neighboring network element sends the protection switching, and the matching relations of the switch pages are shown in Table 3 when the west neighboring network element sends the protection switching.

TABLE 2

| Opposed switch page (the APS byte sent by the east neighboring node) | Match (present switch page) | not match (present switch page) |
| --- | --- | --- |
| SWITCH_PAGE_IDLE | SWITCH_PAGE_IDLE, SWITCH_PAGE_SPAN_WEST | Other pages |
| SWITCH_PAGE_PASS | SWITCH_PAGE_PASS | Other pages |
| SWITCH_PAGE_RING_WEST | SWITCH_PAGE_RING_EAST | Other pages |
| SWITCH_PAGE_RING_EAST | SWITCH_PAGE_PASS | Other pages |
| SWITCH_PAGE_SPAN_BIDIRECTION | SWITCH_PAGE_SPAN_EAST, SWITCH_PAGE_SPAN_BIDIRECTION | Other pages |
| SWITCH_PAGE_SPAN_WEST | SWITCH_PAGE_SPAN_EAST, SWITCH_PAGE_SPAN_BIDIRECTION | Other pages |

TABLE 2-continued

| Opposed switch page (the APS byte sent by the east neighboring node) | Match (present switch page) | not match (present switch page) |
|---|---|---|
| SWITCH_PAGE_SPAN_EAST | SWITCH_PAGE_IDLE, SWITCH_PAGE_SPAN_EAST, SWITCH_PAGE_SPAN_WEST, SWITCH_PAGE_SPAN_BIDIRECTION | Other pages |

TABLE 3

| Opposed switch page (the APS byte sent by the west neighboring node) | Match (present switch page) | not match (present switch page) |
|---|---|---|
| SWITCH_PAGE_IDLE | SWITCH_PAGE_IDLE, SWITCH_PAGE_SPAN_EAST | Other pages |
| SWITCH_PAGE_PASS | SWITCH_PAGE_PASS | Other pages |
| SWITCH_PAGE_RING_EAST | SWITCH_PAGE_RING_WEST | Other pages |
| SWITCH_PAGE_RING_WEST | SWITCH_PAGE_PASS | Other pages |
| SWITCH_PAGE_SPAN_BIDIRECTION | SWITCH_PAGE_SPAN_WEST, SWITCH_PAGE_SPAN_BIDIRECTION | Other pages |
| SWITCH_PAGE_SPAN_EAST | SWITCH_PAGE_SPAN_WEST, SWITCH_PAGE_SPAN_BIDIRECTION | Other pages |
| SWITCH_PAGE_SPAN_EAST | SWITCH_PAGE_IDLE, SWITCH_PAGE_SPAN_EAST, SWITCH_PAGE_SPAN_WEST, SWITCH_PAGE_SPAN_BIDIRECTION | Other pages |

Figure 5:
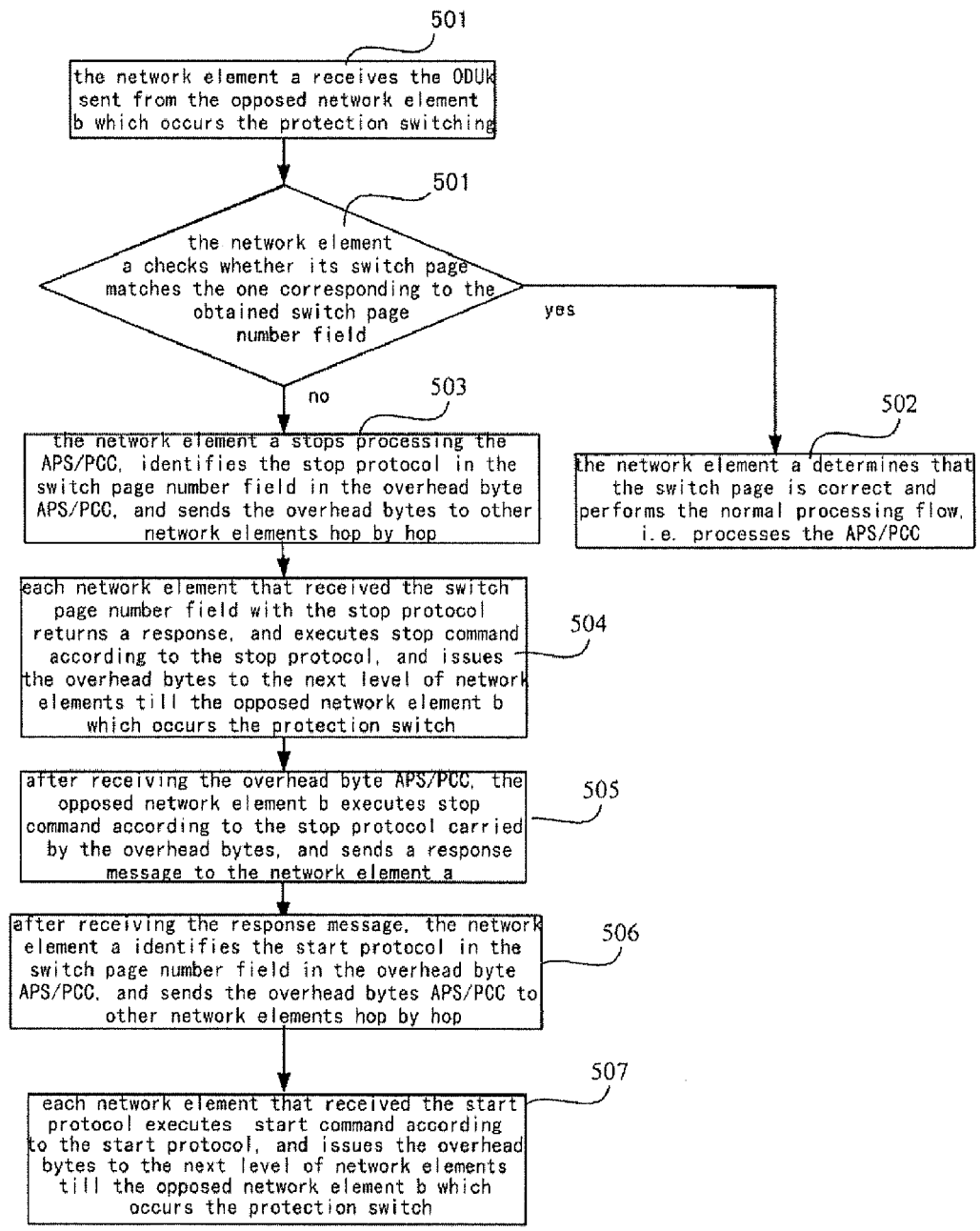
FIG. 5 is a flow chart showing the detailed implementation of the processing for the switch page according to an embodiment of the present invention.

Based on the above settings, the detailed flow of checking for the switch page is shown in FIG. 5 and comprises the following steps:

Step 501, after receiving the ODUk from the opposed network element b in which the protection switching takes place, the network element a checks whether its own switch page matches with the one corresponding to the switch page number field in the overhead byte APS/PCC in the received ODUk. If yes, turn to step 502; otherwise, turn to step 503.

Step 502, the network element a determines that the switch page is correct and so the normal processing flow is performed to process the APS/PCC, i.e. the network element a may perform the corresponding switch operation according to the received overhead byte APS/PCC.

Step 503, the network element a stops processing the overhead byte, i.e. stops processing the APS protocol and initiates the stop protocol, i.e. the network element a identifies the stop protocol in the switch page number field of the overhead byte APS/PCC and sends the overhead byte to other network elements hop by hop.

Step 504, each network element that received the switch page number field with the stop protocol executes stop command, i.e., stops processing the APS/PCC and issues the overhead bytes to the next level of network elements till the opposed network element b in which the protection switching takes place.

In the ring network, all the network elements except a and b are the middle network elements.

Step 505, after receiving the overhead byte APS/PCC, the opposed network element b in which the protection switching takes place executes stop command, i.e., stops processing the APS/PCC according to the overhead bytes with the stop protocol and sends a response message to the network element a.

Step 506, after receiving the response message from the opposed network element b in which the protection switching takes place, the start protocol is used to recover protocols in the whole network to the normal status, i.e. the network element a identifies the start protocol in the switch page number field in the overhead byte APS/PCC and sends the overhead bytes to other network elements hop by hop.

Step 507, each network element which received the switch page number field with the start protocol executes start-up command according to the start protocol carried in the overhead bytes and issues the overhead bytes to the next level of network elements till the opposed network element b in which the protection switching takes place.

The processing for the switch page can be implemented through the above procedures.

In order to further improve the reliability, in the above step 503, the network element which determines that the switch pages do not match each other can start-up a timer before it stops processing the overhead bytes, and after the timer is overtime, it determines whether the two switch pages are matched with each other or not, and if yes, execute the normal switch operation flow; otherwise, the network element stops processing the overhead bytes and starts the processing of the stop command.

In order to improve the reliability, in the above step 504, after the network element that received the overhead bytes executes the stop command, it also can start-up a timer. If the network element still does not receive the overhead bytes with the start protocol after the timer is overtime, it will actively execute the start-up command to start-up its protocol and begins to process the overhead byte APS/PCC. Through the processing, all the middle network elements in the ring network of OTN will automatically start-up the protocol after the timer is overtime, so that the whole network can start-up the protocol by this mechanism after stopping the protocol. In this way, the reliability for recovery of the whole network is improved.

In the present embodiment, since the ring network may adopt many protocols typically, the protocol type field is set in the overhead byte APS/PCC to identify the normal APS protocol, the cross-ocean APS protocol, and the version information of the normal APS protocol. Based on this setting, all the network elements in the OTN ring network will check the protocol type field in the received overhead byte APS/PCC, and if the protocol type field does not match the one used by the present network element, then reporting the alarm will be initiated.

In the present embodiment, to solve the problem that only one value can be used to identify the LP-S and the SF-P, the switching request field is extended. For example, 5 bits are allocated to the switching request field so as to make the field allocate respective flag for the LP-S and the SF-P.

The switching request field includes the following statuses:
Lockout of Protection (Span)
Signal Fail (Protection)
Forced Switch (Span)
Forced Switch (Ring)
Signal Fail (Span)
Signal Fail (Ring)
Signal Degrade (Protection)
Signal Degrade (Span)
Signal Degrade (Ring)
Manual Switch (Span)
Manual Switch (Ring)
Wait-To-Restore
Exerciser (Span)
Exerciser (Ring)
Reverse Request (Span)
Reverse Request (Ring)
No Request In the present embodiment, just after 5 bits are allocated to the switching request field, every switching request may be allocated a request code. Table 4 shows a kind of setting.

TABLE 4

Switching request Code (Bits D1-D5)

| Bits D1 D2 D3 D4 D5 | | |
|---|---|---|
| 1 0 0 0 0 | Lockout of Protection (Span): | LP-S |
| 0 1 1 1 1 | Signal Fail (Protection): | SF-P |
| 0 1 1 1 0 | Forced Switch (Span): | FS-S |
| 0 1 1 0 1 | Forced Switch (Ring): | FS-R |
| 0 1 1 0 0 | Signal Fail (Span): | SF-S |
| 0 1 0 1 1 | Signal Fail (Ring): | SF-R |
| 0 1 0 1 0 | Signal Degrade (Protection): | SD-P |
| 0 1 0 0 1 | Signal Degrade (Span): | SD-S |
| 0 1 0 0 0 | Signal Degrade (Ring): | SD-R |
| 0 0 1 1 1 | Manual Switch (Span): | MS-S |
| 0 0 1 1 0 | Manual Switch (Ring): | MS-R |
| 0 0 1 0 1 | Wait-To-Restore: | WTR |
| 0 0 1 0 0 | Exerciser (Span): | EXER-S |
| 0 0 0 1 1 | Exerciser (Ring): | EXER-R |
| 0 0 0 1 0 | Reverse Request (Span): | RR-S |
| 0 0 0 0 1 | Reverse Request (Ring): | RR-R |
| 0 0 0 0 0 | No Request: | NR |
| Others | Reserved for future use | |

To solve the problem that the amount of the network elements in the OTN ring network is comparatively small, the requested source network element number field and the requested destination network element number field are respectively extended. For example, they are extended to 5 bits so that the value range is from 0 to 31, and so the current amount of the network elements becomes more than the original amount of the network elements, i.e., 16 by 16. Therefore, there can be 32 nodes in the same OTN ring network.

Practically, the switch status field can be set according to the current existing set manner. For example, 3 bits are allocated to the field and the corresponding values are shown in Table 5.

TABLE 5

Switch Status

| Bits H1 H2 H3 | |
|---|---|
| 1 1 1 | Reserved for future use |
| 1 1 0 | Reserved for future use |
| 1 0 1 | Reserved for future use |
| 1 0 0 | Reserved for future use |
| 0 1 1 | Extra Traffic on Protection Channels |
| 0 1 0 | Bridged and Switched (Br&Sw) |
| 0 0 1 | Bridged (Br) |
| 0 0 0 | Idle |

The above settings can be made for the overhead byte APS/PCC, respectively, and all the above settings also can be made. An embodiment for the allocation of all the above fields when all the above settings are made for the overhead byte APS/PCC is provided. The allocation scheme is shown in FIG. 6, wherein A represents the serial number field of the overhead byte, B represents the switch page number field, C represents the protocol type field, D represents the switching request field, E represents the requested destination network element number field, F represents the requested source network element number field, G represents the requested long or short path flag field, H represents the switch status field, and I represents the check field.

It can be seen from FIG. 6 that:

3 bits can be allocated to the serial number field in the overhead bytes and the serial number can be circularly used between 0 to 7; 4 bits can be allocated to the switch page field, at this time, not only all the current switch pages may be identified but also some new switch pages may be added;

2 bits may be allocated to the protocol type so both the normal APS protocol and the cross-ocean APS protocol can be represented, and the different versions of the normal APS protocol can be represented, and other protocols can be extended;

5 bits can be allocated to the protection switching request field so as to meet the allocation of all the current types of the protection switching request, and the extension of the protection switching requests may be supported;

5 bits can be allocated to the requested destination network element number field and the requested source network element number field so that the values of the network element number are from 1 to 31, which are more than those in the SDH ring network by 16, and more ring network resources can be supplied;

1 bit is likewise allocated to the long or short path flag field, wherein 0 represents the short path and 1 represents the long path and of course vice versa;

3 bits are likewise allocated to the switch status field;

4 bits can be allocated to the check field so that the network elements can determine by checking whether error codes which lead to the signaling being unavailable will appear in the APS signaling carried in the overhead byte APS/PCC in the ODUk transmitted by the former 28 network elements.

In the present embodiment, some substitutes can be made. For example, other management information path can be used to transmit the message so as to accomplish the check of the switch page, such as the General Communication Channel (GCC) in the OTN equipment; the present embodiment may use other overhead bytes to check the overhead byte APS/PCC to find out the error codes, and also may use the time-sharing transmission or the other overhead bytes to transmit the serial number so as to prevent the loss of the overhead byte APS/PCC.

It should be appreciated that, the present invention is described with reference to the above-preferred embodiments, which are not limitations to the present invention. It will be apparent to those skilled in the art that various modifications and variations can be made without departing from the spirit and scope of the present invention, as defined by the appended claims.

The invention claimed is:

1. A protection method for ring network of an optical transmission network, comprising using the overhead bytes APS or PCC in an ODUk to transmit the protection switching reformation of the APS, wherein a serial number field is added to the APS/PCC, and the method further comprises:

changing the serial number of a current transmission direction of a network element according to a set rule, and sending the changed serial number to other network elements through the serial number field in the APS/PCC;

obtaining the serial number carried in the serial number field in the APS/PCC, and comparing the serial number with one stored in all opposed network element itself and corresponding to the network element by the opposed network element and if the two serial numbers accord with the set rule, determining that no overhead byte is lost, wherein a switch page number field is added in the APS/PCC the method further comprising:

setting matching relations of the switch pages, sending its own switch page number to other network elements through the switch page number field in the APS/PCC by the network element;

the switch page number carried by the APS/PCC, and determining whether the switch page corresponding to the switch page number matches one of the present network elements according to the matching relation of the switch pages, and if yes, performing the switch processing; otherwise, stopping processing the APS/PCC and sending a stop protocol to other network elements through the switch page number field to stop processing the APS/PCC protocol; and the method further comprising: each network element that received the stop protocol stopping processing the APS/PCC and sending the APS/PCC to other network elements hop by hop till the network element in which the protection switching takes place;

the network element in which the protection switching takes place stopping processing the APS/PCC and sending a response message to the network element which initiates the stop protocol;

after receiving the response message, the network element which initiates the stop protocol sending a start protocol identifying the start-up of the OTN ring network to other network elements through the switch page number field in the APS/PCC;

each network element that received the start protocol beginning to process the APS/PCC and sending the APS/PCC to other network elements hop by hop till the network element in which the protection switching takes place.

2. The method according to claim 1, wherein, the step of each network element that received the stop protocol stopping processing the APS/PCC and sending the APS/PCC to other network elements hop by hop till the network element in which the protection switching takes place further comprises: after receiving the stop protocol, each network element starting up a timer and if receiving the start protocol before the timer is overtime, performing the step of each network element that received the start protocol beginning to process the APS/PCC and sending the APS/PCC to other network elements hop by hop till the network element in which the protection switching takes place; otherwise, automatically initiating the protocol of the present network element, and processing the APS/PCC.

* * * * *